United States Patent
Wnuk et al.

(10) Patent No.: US 6,836,963 B2
(45) Date of Patent: Jan. 4, 2005

(54) PROCESS FOR PRODUCTION OF CONICAL FILTER ELEMENTS

(75) Inventors: Ralf Wnuk, Bexbach (DE); Martin Winter, Wadern (DE); Norbert Lang, Blieskastel (DE)

(73) Assignee: HYDAC Process Technology GmbH, Neunkirchen (DE)

(*) Notice: Subject to any disclaimer, the term of this patent is extended or adjusted under 35 U.S.C. 154(b) by 0 days.

(21) Appl. No.: 10/426,974

(22) Filed: May 1, 2003

(65) Prior Publication Data

US 2003/0213127 A1 Nov. 20, 2003

(30) Foreign Application Priority Data

May 7, 2002 (DE) .......................................... 102 20 273

(51) Int. Cl.⁷ .......................... B23P 15/16; B01D 29/50
(52) U.S. Cl. .............................. 29/896.61; 29/896.62; 210/497.1; 210/497.3
(58) Field of Search .................. 29/896.61, 896.62, 29/896.6; 210/497.01, 497.1, 497.2, 497.3

(56) References Cited

U.S. PATENT DOCUMENTS

| | | | | |
|---|---|---|---|---|
| 2,203,815 A | * | 6/1940 | Dahl et al. .................. 210/232 |
| 2,536,274 A | * | 1/1951 | Gaugler ....................... 210/484 |
| 4,461,945 A | * | 7/1984 | O'Cheskey et al. ... 219/121.63 |
| 4,680,117 A | | 7/1987 | Freeman ...................... 210/474 |
| 4,742,872 A | | 5/1988 | Geske .......................... 166/231 |
| 4,969,999 A | * | 11/1990 | Riddell .................. 210/497.01 |
| 5,230,131 A | * | 7/1993 | Hobson, Jr. .............. 29/402.06 |
| 5,260,539 A | * | 11/1993 | Reinke .......................... 219/56 |
| 5,849,054 A | * | 12/1998 | Fujisawa ....................... 55/486 |
| 6,027,663 A | * | 2/2000 | Martin et al. .................. 216/71 |
| 6,228,274 B1 | * | 5/2001 | Deibel et al. ............... 210/798 |

FOREIGN PATENT DOCUMENTS

| | | | |
|---|---|---|---|
| DE | 2242018 | | 1/1973 |
| DE | 4345412 | | 6/1995 |
| DE | 19711589 | | 9/1998 |
| GB | 1265784 | * | 3/1972 |
| WO | 8901358 | | 2/1989 |

OTHER PUBLICATIONS

Office Action dated Dec. 4, 1975; German Application No. 75 09 253.

* cited by examiner

Primary Examiner—Marc Jimenez
(74) Attorney, Agent, or Firm—Roylance, Abrams, Berdo & Goodman L.L.P.

(57) ABSTRACT

A process for production of conical filter elements, in particular slotted tube filter elements, includes forming a support structure of a plurality of support rods around which is wound at least one wire profile in individual turns. Slots are left clear in the wire profile through which a fluid may pass. The wire profile is, at least in part, rigidly connected to the support rods and is enclosed in a screen grid. The screen grid, at least in part, rests against the wire profile, follows to the same extent the conical path of the filter element, and is provided on its ends with end components. Since the conical screen grid is in the form of a one-piece pull-on part fitted on the support structure and since the pull-on part is designed to be longer than the support structure, after the screen grid has been pulled onto the support structure, at least one projecting length of the screen grid may be separated for precision fitting and is connected to the respective end component of the filter element. The screen grid may be produced integrally with the remaining filter element in advance of the connection process and subsequently pulled onto the support structure with wire profile like a stocking.

11 Claims, 2 Drawing Sheets

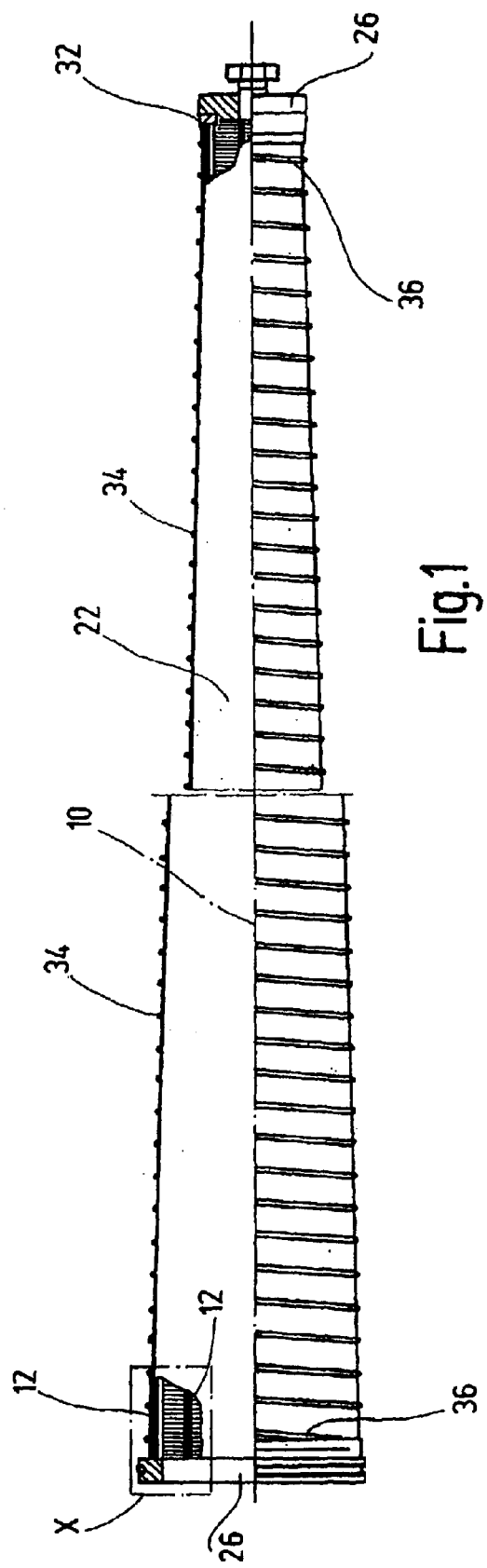
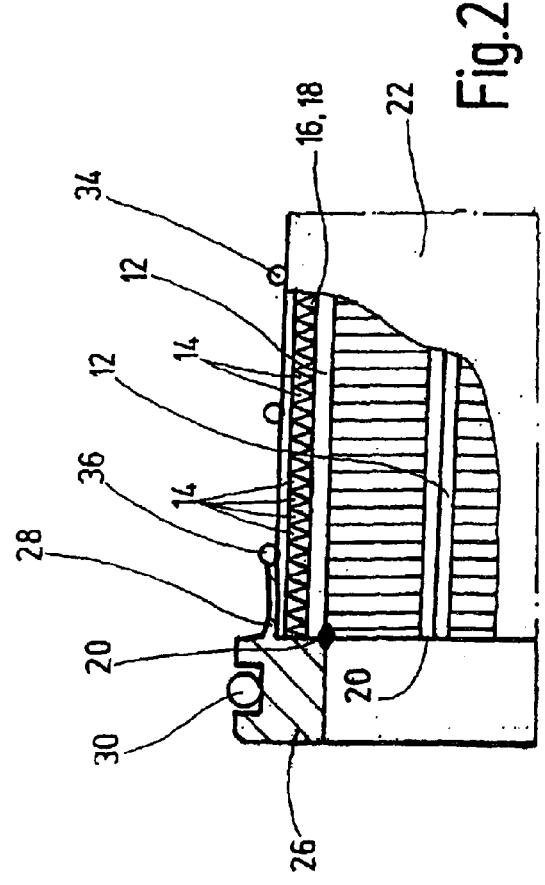

PROCESS FOR PRODUCTION OF CONICAL FILTER ELEMENTS

FIELD OF THE INVENTION

The present invention relates to a process for production of conical or frustoconical filter elements, slotted tube filter elements in particular. The support structure of the filter element is formed of a plurality of support rods around which at least one wire profile is wound in individual turns. Slots are left clear in the wire profile through which a fluid may pass. The wire profile, at least in part, is rigidly connected to the support rods, and is surrounded by a screen grid resting at least in part against the wire profile. The screen grid follows to the same extent the conical path of the filter element, and is provided on its ends with end components.

BACKGROUND OF THE INVENTION

DE 197 11 589 A1 discloses a filter element, a slotted tube filter element in particular, with support rods around which is wound at least one wire profile in individual turns. Slots are left clear through which a fluid may pass. The profile is welded at least in part to the support rods. Filter elements such as this are readily obtainable on the market in both cylindrical and conical form. These filter elements are used, among other applications, in so-called reversible flow filter devices. Such devices have a filter inlet and a filter outlet for the fluid to be filtered. Fluid flows from the interior outward, or from the exterior inward subsequently for a reversible flow process. The respective fluid flows may also be provided in the reverse order for filtration and reverse flow for special areas of application.

One end of each rod support is inclined at an angle to the longitudinal axis of the filter element. The turns of the respective wire profile decrease in diameter in the direction of the sloped ends of the support rods to achieve the conical design of the respective filter element. The fluid intake area in the element is very large. The distance between the filter elements, if such elements are used in the reversible flow filter device described, increase in the direction of the outlet side of the housing. In this manner, the fluid is subjected to lower resistance on emerging from the interior of the respective filter element than in cylindrical elements. Accordingly, the pressure differential or the pressure as a whole decreases, a favorable situation from the viewpoint of the energy balance. In addition, constant flow of fluid is achieved during reverse flow. Flow at a constant rate is favorable in cleaning of the filter elements and gentle in operation of the reversible flow filter device.

The support grid structure, along with the wound-on wire profile, is enclosed on the outer circumference in a correspondingly conical screen grid for production of the conventional slotted tube filter element. The screen grid may be wound in strips around the wire profile, with the individual turns of the sieve filter connected to each other. The connection with the wire profile itself is produced by welded seams. The production process involved is costly. Moreover, the screen grid does not always come into direct contact with the wire profile. This process accordingly adversely affects filtration output and, on the whole, the rigidity of the entire filter.

SUMMARY OF THE INVENTION

Objects of the present invention is provide a process for making a conical filter element which is simple and cost-effective and which achieves improved filtration results.

The foregoing objects are basically obtained by a process for producing conical filter elements, comprising arranging a plurality of support rods along substantially straight lines extending on an exterior surface of a cone from a base of the cone to an apex of the cone. A wire profile is wound about the support rods in individual turns with slots between the individual turns through which fluid may pass. The wire profile is rigidly connected to outer surfaces of the support rods, at least in part, to form a support structure. A one-piece, substantially conical screen grid is pulled onto the support structure such that the screen grid surrounds the wire profile and at least partially rests against the wire profile. The conical screen grid has a conical shape corresponding to the support structure and has an axial length greater than an axial length of the support structure, to provide at least one projecting length portion of the screen grid extending from the support structure after the screen grid is pulled onto the support structure. First and second end components are attached on opposite axial ends of the screen grid. The first end component is connected and retained, with precision fitting of the screen grid, to the one end of the screen grid.

By performing the process in this manner, the screen grid may be produced in advance of its connection integrally with the remainder of the filter element structure, and then fitted on the support structure with wire profile like a stocking. The more or less equal amounts of taper between the inner circumference side of the screen grid and the outer circumference side of the wire profile of the support structure permit achieving a precision-fitted application process more or less free of play, so that the screen grid rests directly on the external turns of the wire profile.

As a result of the precision-fitted seating, the overall structure is very rigid and the filter screen is more or less self-supporting to increase the overall stability of the filter element. In particular, bulging, which the conical screen grid is raised from the wire profile structure, cannot occur even when the direction of filtration extends from the interior outward through the filter element. Such bulging is prevented by the inherent stability of the screen grid alone.

In one preferred embodiment of the process of the present invention, the screen grid is made from a blank of flexible filter material which is bent and rigidly connected along both of its longitudinal edges facing each other, especially by way of a weld seam, to form a conical tube. The weld seam in question may be obtained by rolled seam welding or the like, and joins the two longitudinal edges of the screen grid free of projection to form the conical slotted tube.

In another preferred embodiment of the process of the present invention, one component of the filter element is in the form of an end cap, having on its one free end a receptacle component. After the length of the screen grid has been reduced, the receptacle component overlaps the screen grid on its free end, and is pressed against the outer circumference of the screen grid in the area of its free end by a crimping or flanging process for forming rigid connection of end cap to screen grid. The connection of the end cap to the screen grid can be produced in a cost-effective and clean production technological manner by the crimping or flanging process.

Preferably, the free ends of the support rods are connected directly to the respective end part, preferably by a welding process, or at least a part of each support rod free end is received into a common fastening component by which connection to the associated end component of the filter element is effected.

In another especially preferred embodiment of the process of the present invention, a support component, especially in the form of a spiral support wire, extends around the screen grid. Both free ends of the support component can rest on the respective end component. By the support component, especially one in the form of a spiral support wire, the resistance to bulging from the interior outward may be further increased by the filter element. In this way, the screen grid may be secured as specified on the wire profile. Provision is preferably made such that the support wire is wound in the same direction as that of the taper of the slotted tube. The components of the filter element are preferably made of special steel material, and in particular the support grid as well is made of such material. With such material the structure as a whole has little susceptibility to corrosion. Also, cleaning, especially by way of reversible flow filter processes, is also made easier by selection of this material.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a partial side elevational view in partial section of filter element, with a center portion omitted according to the present invention;

FIG. 2 is an enlarged side elevational view in partial section of the filter element in area X of FIG. 1.

DETAILED DESCRIPTION OF THE INVENTION

Figure 3:
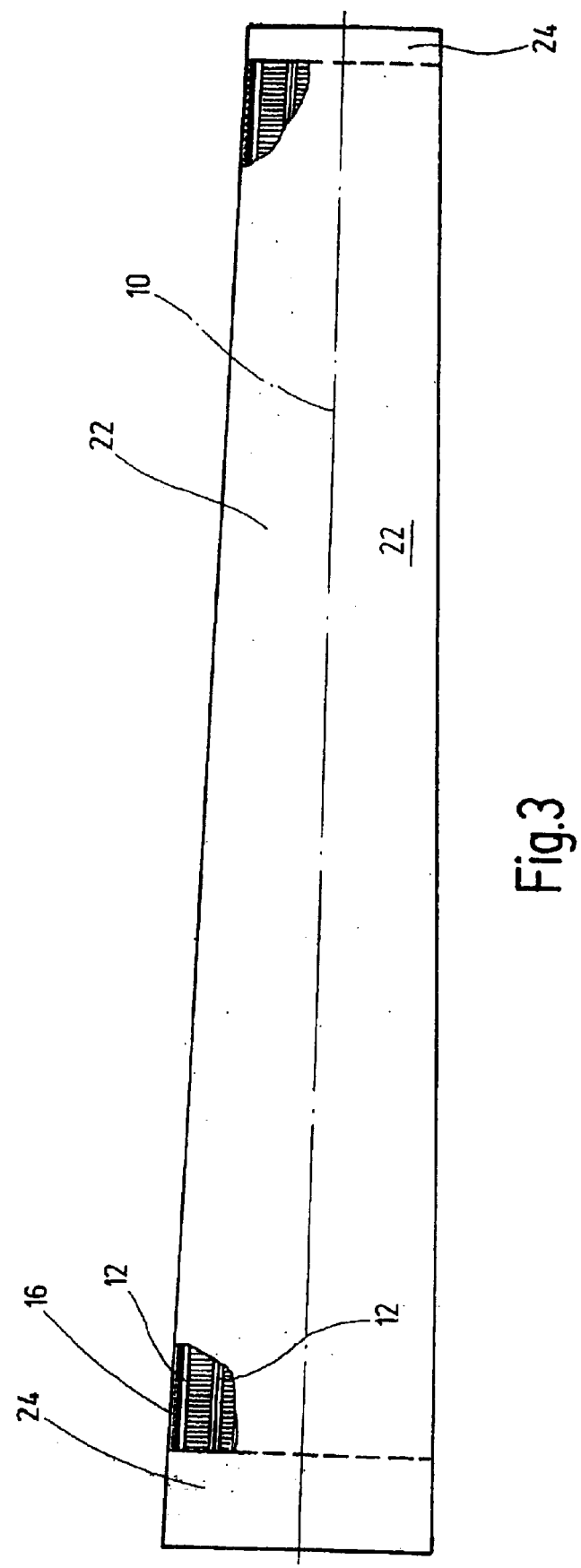
FIG. 3 is a side elevational view in partial section of the filter element with the screen grid pulled onto the support structure of support rods with wire profile turns according to the present invention.

The slotted tube filter element, shown in the side view of FIG. 1, has individual support rods 12 extending in the direction of its longitudinal axis 10. A plurality of these rods are mounted opposite each other and diametrically opposite the longitudinal axis 10, over a predetermined outer circumference at predetermined intervals. A wire profile 16 is wound in individual turns 18 to provide a weld point in the area of each point of contact of the wire profile 16 with a support rod 12 which may be associated with it. Slots 14 through which a fluid (hydraulic medium) may pass are left clear in the wire profile (see FIG. 2). The size of the slot provided for free passage of fluid, that is, the distance between two individual turns 18, is shown as a schematic diagram of individual triangles in cross section, in particular in the enlargement shown in FIG. 2. An increase in the width of the slot outward presents the advantage that a kind of spiral guide is formed which facilitates flushing of impurities from the slot spaces, especially during filtration.

As FIG. 1 also shows, between its two free ends 20 (see FIG. 2) of each support rod 12 is inclined at an angle to the longitudinal axis 10 such that a filter element extending conically or frustoconically as a whole is formed. Each support rod extends along a straight line on the surface of a cone, which line extends between the cone apex and the cone base. The cone is a right circular cone. The turns 18 of the wire profile 16 decrease in diameter in the direction of the noticeably support rods 12. In place of a single wire profile 16 as illustrated in the figures, a plurality of wire profiles 16 may optimally be used and mounted in succession in different arrangements or one above the other and of coiled wire profiles 16 (not shown), if necessary for performance of the assigned filtration function. The length of the slotted tube filter element, as measured in the direction of the longitudinal axis 10, is in this instance approximately 11 times greater than the largest fluid inlet cross section present on the left end of the filter element as viewed in FIG. 1.

The support rods 12 and the wire profile 16 are formed of special steel. The support rods 12 are square in cross section, while the wire profile 16 is triangular in cross section. The slot widths to be selected are to be adapted to the size of the solid components to be filtered from the fluid, especially that in the form of hydraulic fluid. The filtered fluid passes through the slots 14. The solid components or fouling components are retained by the turns 18 of the wire profile 16, remaining inside the filter element or being partly lodged in the slots 14. With an increase in the period of use of the slotted tube filter element, the latter becomes increasingly clogged and can no longer be used for execution of filtration. When clogged, the filter element is unclogged by backwashing in the direction opposite that of fluid passage. After the unclogging, the filter element may then be used again for filtration processes. In particular, the filter elements in question may be used in overall filtration devices such as have already been described in FIG. 2, together with the pertinent portions of text in DE 197 11 589 A1.

Consequently, for the purpose of producing the conical filter element illustrated in FIG. 1, the support structure of a plurality of the support rods 12 in question is formed. After forming the support structure, the respective wire profile 16 is wound in individual turns. Slots 14 are left clear for passage of a fluid. The respective wire profile is then rigidly connected, at least in part, to the support rods 12 of the support structure. The respective wire profile 16 is enclosed in a screen grid 22 which is shown in the figures as a continuous conical or frustoconical element. In fact, however, the screen grid 22 has a screen grid structure (not shown) such as a mesh fabric with predetermined passage cross-sections. Accordingly, the fluid can immediately pass through the screen grid 22. Fouling elements of predetermined size may be retained as a function of the assigned mesh width. The screen grid 22 rests at least in part against the outer circumference of the wire profile 16, and otherwise follows the conical path of the filter element to the same extent, especially in the length/diameter ratio of 1:11 referred to.

As is shown by FIG. 2 in particular, the conical screen grid 22 is in the form of a one-piece pull-on component, like a stocking, for mounting on the support structure of support rods 12 and wire profile 16. As the illustration in FIG. 3 makes clear, the pull-on component is longer than the support structure with the support rods 12. The excess length selected is such that the support rods 12 with wire profile 16 may be introduced directly into the interior of the screen grid 22. The structural components 12 and 16 are displaced into the interior of the screen grid 22 (from left to right as viewed in the line of sight to FIG. 3) to the extent that tight fitting of support rods 12 with wire profile 16 against the inner circumference side of the screen grid 22 is effected. In this way, the application of screen grid 22 to the outer circumference side of the respective wire profile turn 16 is virtually free of play. Depending on the predetermined tolerance values, the screen grid 22 may in any event exhibit a projecting length, such that a projecting length remains on the screen grid jacket despite reception of the support rods 12 with wire profile 16. In other words, screen grid 22 has axially projecting lengths 24 extending axially beyond the support structure formed by support rods 12 and wire profile 16. As soon as the screen grid has been fitted with precision on the turns 18 of the wire profile 16, the projecting lengths 24 are cut off cleanly or otherwise separated on both ends of the screen grid 22. In this way the ends of the screen grid 22 may then be rigidly connected to the respective end components 26 of the filter element.

It is best for the screen grid 22 to be obtained from a level blank of a flexible filter material (not shown). After being bent to form a conical tube, the screen grid is rigidly connected, in particular by a weld seam, along its two facing longitudinal edges (not shown). The weld seam may be obtained, for example, by roll seam welding.

As is also to be seen from the illustrations in FIGS. 1 and 2, one end component 26 of the filter element is in the form of an end cap provided on its free end with a receptacle component 28. After the screen grid 22 has been reduced by the amount of the projecting lengths 24, the end component overlaps the screen grid 22 on its respective free end. For a rigid connection of end component 26 and screen grid 22, receptacle component 28 is pressed against the outer circumference of the screen grid 22 in the area of its free end by a crimping or flanging process. In this instance, an option exists of effecting the connection by a conventional welding process, rather than by the connection the crimping or flanging option indicated. As viewed in the line of sight to FIG. 1, an O-ring 30 is mounted on the outer circumference of the left end cap 26. This O-ring is for subsequent mounting of the filter element in an overall filter device (not shown).

The free ends of support rods 12 are rigidly connected directly to the respective end component 26 by a weld seam, as is illustrated in FIG. 2. Alternatively, on the opposite end as shown in FIG. 1, the free ends of support rods 12 are welded on a circular or annular fastening component 32, which is then suitably connected to the associated end cap 26.

A support component 34, especially one in the form of a spiral support wire, may be extended around the screen grid 22 on the outer circumference side. Free ends 36 of this support wire rest on the respective end components 26. The support component 34 in the form of the support wire is wound in the same direction as the slope of the slotted tube.

The filter element of the present invention and its production process may be adapted so that a modular construction system for individual components of predetermined sizes is available. A modular system may be supplemented as required, for a particular filter element. The production process of the present invention may otherwise be applied to obtain a highly rigid overall system for a filter element which permits protracted trouble-fee operation, along with lowering of production and maintenance costs.

While one embodiment has been chosen to illustrate the invention, it will be understood by those skilled in the art that various changes and modifications can be made therein without departing from the scope of the invention as defined in the appended claims.

What is claimed:

1. A process for producing conical filter elements, comprising the steps of:
    arranging a plurality of support rods along substantially straight lines extending on an exterior surface of a cone from a base of the cone to an apex of the cone;
    winding a wire profile about the support rods in individual turns with slots between the individual turns through which fluid may pass;
    rigidly connecting the wire profile to outer surfaces of the support rods, at least in part, to form a support structure;
    pulling a one-piece, substantially conical screen grid onto the support structure such that the screen grid surrounds the wire profile and at least partially rests against the wire profile, the conical screen grid having a conical shape corresponding to the support structure and having an axial length greater than an axial length of the support structure to provide at least one projecting length portion of the screen grid extending from the support structure after the screen grid is pulled onto the support structure; and
    attaching first and second end components on opposite axial ends of the screen grid, the first end component being connected and retained, with precision fitting of the screen grid, to one end of the screen grid.

2. A process according to claim 1 further including
    forming the screen grid from a blank of flexible filter material having longitudinal edges by bending the blank to form a substantially conical tube and then fixedly connecting the longitudinal ends together.

3. A process according to claim 2 wherein
    the longitudinal edges are fixedly connected by a weld seam.

4. A process according to claim 1 wherein
    the length of the screen grid is reduced;
    the first end component is an end cap having a receptacle component on a free end thereof, the end cap being placed on the screen grid such that the screen grid is received in the receptacle component and the receptacle component overlaps the screen grid; and
    the receptacle component is pressed by a crimping and flanging process against an outer surface portion of the screen grid adjacent the receptacle component free end to provide a fixed connection between the screen grid and the end cap.

5. A process according to claim 1 wherein
    free ends of the support rods are rigidly connected to one another by the second end component.

6. A process according to claim 5 wherein
    the free ends of the support rods are welded to the second end component.

7. A process according to claim 1 wherein
    at least one part of free ends on one side of the support rods are received into a common fastening component; and
    the second end component is coupled to the fastening component.

8. A process according to claim 1 wherein
    a support component is placed to extend on an outer surface of the screen grid.

9. A process according to claim 8 wherein
    the support component is a support wire wound along a spiral path and having free ends supporting the end components.

10. A process according to claim 9 wherein
    the support wire is wound in a direction the same as a slope of the support structure.

11. A process according to claim 1 wherein
    the components and the screen grid are formed of steel.

* * * * *